(12) United States Patent
Sigurgardarsson

(10) Patent No.: US 12,114,672 B2
(45) Date of Patent: Oct. 15, 2024

(54) DEVICE AND METHOD FOR FILLETING AND PIN-BONE REMOVAL

(71) Applicant: VELFAG EHF., Akureyri (IS)

(72) Inventor: Bjarmi Arnfjord Sigurgardarsson, Akureyri (IS)

(73) Assignee: VELFAG EHF., Akureyri (IS)

( * ) Notice: Subject to any disclaimer, the term of this patent is extended or adjusted under 35 U.S.C. 154(b) by 133 days.

(21) Appl. No.: 17/801,088

(22) PCT Filed: Feb. 19, 2021

(86) PCT No.: PCT/IS2021/050003
§ 371 (c)(1),
(2) Date: Aug. 19, 2022

(87) PCT Pub. No.: WO2021/166001
PCT Pub. Date: Aug. 26, 2021

(65) Prior Publication Data
US 2023/0079393 A1 Mar. 16, 2023

(30) Foreign Application Priority Data
Feb. 19, 2020 (IS) .......................................... 050292

(51) Int. Cl.
| A22C 25/00 | (2006.01) |
| A22C 25/08 | (2006.01) |
| A22C 25/16 | (2006.01) |
| A22C 25/17 | (2006.01) |
| A22C 25/18 | (2006.01) |

(52) U.S. Cl.
CPC ............ *A22C 25/166* (2013.01); *A22C 25/08* (2013.01); *A22C 25/17* (2013.01); *A22C 25/18* (2013.01)

(58) Field of Classification Search
CPC ....... A22C 25/166; A22C 25/16; A22C 25/17; A22C 25/18; A22C 25/08
USPC .......................................................... 452/125
See application file for complete search history.

(56) References Cited

U.S. PATENT DOCUMENTS 4,084,294 A * 4/1978 Dohrendorf ........... A22C 25/08
452/182
4,236,275 A * 12/1980 Westerdahl ............ A22C 25/16
452/179

(Continued)

FOREIGN PATENT DOCUMENTS

EP 2974602 A1 1/2016

OTHER PUBLICATIONS

International Search Report and Written Opinion dated May 10, 2021 for corresponding International Application No. PCT/IS2021/050003.

*Primary Examiner* — Richard T Price, Jr.
(74) *Attorney, Agent, or Firm* — Tarolli, Sundheim, Covell & Tummino LLP

(57) ABSTRACT

The present invention relates to an improved method and a device for mechanically filleting and removing pin-bones from gutted fish using conventional filleting devices, where the fish rests on a saddle on a conveyor using pairs of circular knives to separate the fillet from the backbone. The apparatus and method are designed to facilitate mechanical filleting and pin-bone removal of gutted fish with the head intact. The present invention provides a more accurate method of positioning the pin-bones in the gutted fish.

28 Claims, 4 Drawing Sheets

(56) References Cited

U.S. PATENT DOCUMENTS

| | | | |
|---|---|---|---|
| 7,988,542 B1 * | 8/2011 | Yamase | A22C 25/16 452/150 |
| 9,357,789 B2 | 6/2016 | Kowalski | |

* cited by examiner

DEVICE AND METHOD FOR FILLETING AND PIN-BONE REMOVAL

RELATED APPLICATIONS

The present application is a U.S. National Stage application under 35 USC 371 of PCT Application Serial No. PCT/IS2021/050003, filed on 19 Feb. 2021, which claims priority from IS Patent Application No. 050292, filed 19 Feb. 2020, the entirety of both of which are incorporated herein by reference.

FIELD OF THE INVENTION

The invention relates to a method and a device for removing pin-bones from gutted fish on a filleting device. More specifically, the present invention relates to a method and device for positioning the pin-bones in the gutted fish to more accurately separate the pin bones without removing more flesh than necessary.

BACKGROUND

In the fast-developing field of food processing, where the demand for better quality products is constantly increasing, development is taking place every day for improved methods and devices. In the fishing industry, processing steps such as filleting and de-boning are now performed by mechanical devices instead of by hand. As these steps have been automated, boundaries are now being pushed to increase accuracy, reduce waste meat in the processing, increase speed and preserve quality. Internationally, there is a growing demand for environmental and sustainable management and development of fishery resources, where seafood producers focus more and more on alternative use of by-products and waste as well as value added production of the whole raw material. Historically, by-products from the fish industry have had a low value, where most it has been used for meal production, ensilage and feed for fur-bearing animals. It can easily be argued that filleting machines are generally not designed to preserve the highest potential value of the fillet as well as the by-products. For example, the value of fish forcemeat from pin-bone and abdominal flaps can be raised considerably if they are free from skin and the membranes before grinding.

The way pin-bone cutting and simultaneous processing of abdominal flaps is currently performed in filleting machines (how) creates challenges or even makes impossible to process the by-products in responsible, cost efficient and high value manner. This is especially true for on-board processing where processing space and number staff to do additional manual work on by-products is limited.

Filleting machines operate by separating the fillets from the ventral belly spokes and the dorsal back spokes. Devices such as those disclosed in U.S. Pat. Nos. 9,357,789 and 8,299,050 handle gutted and beheaded fish, where the fish is placed on a saddle of a conveyor with the tail pointing in forward direction of travel and the fins and dorsal back spokes pointing up, leaving the fish centred on the conveyor belt. For white fish, such as cod, the gripping portion of the saddle has two rows of spikes to stabilize the gutted fish on the conveyor during the filleting. The cutting mechanism in traditional filleting devices comprises three sets of circular blades, a first pair for making dorsal cuts from above, a second pair for making ventral cuts from below, and a third pair for making separating cuts from above to separate the fillets from the backbone. The rotating blades operate in the transporting/conveying direction such that the fillets fall from the saddle onto a receiving portion of a belt below the saddle and the backbone of the fish is left on the saddle until it falls off or is removed.

Another part of preparing fish fillets or parts thereof is the removal of intramuscular bones or pin-bones. Traditionally this is done by hand in skinned fillets, where pin-bones are picked out of the flesh. Later methods use cutting means such as knifes to separate the abdominal flap containing the pin bones from the fillet. This has been done both as the fillet has been removed from the backbone and is lying flat on a conveyor, but this has also been done as the fish rests on a saddle of a filleting machine. US . . . discloses a method and a device for mechanically removing pin bones from fillet parts of fish as they are transported on a conveyor, where the head including the collarbone (clavicle) has been separated as well as the majority of the entrails. The pin-bones are removed as a part of the abdominal flaps. In this method, the pin bones are cut out such that a pair of circular blades performs a curved double separating cut along the pin-bones. Removing the pin-bone in a filleting machine has been possible as described in U.S. Pat. No. 9,357,789 B2. However, the methods described have disadvantages when it comes to preserving the yield of the most valuable parts of the fish and to process and return the by-products in ways that meet modern requirements in fish processing that recognize the possibilities for value added production and alternative use of by-products and waste.

The problem with separating pin-bones from fish in this manner is that the cutting means needs to take more flesh than is desired in order not to leave any pin-bones in the fillet. This is a compromise that is difficult to circumvent, especially in white fish such as cod.

SUMMARY OF THE INVENTION

The present invention provides an improved method and a device for mechanically filleting and removing pin-bones from gutted fish with better yield of meat. The device of the present invention uses partially conventional filleting devices, where the fish rests on a saddle on a filleting conveyor using pairs of circular knives to separate the fillet from the backbone. The apparatus and method are designed to facilitate mechanical filleting and making pin-bone cuts into gutted fish where the filleting process delivers fillets with the pin-bone strip and the abdominal flap attached to the fillet. The apparatus is designed so that a fish can be mounted or loaded on the saddle of the filleting conveyor with the head intact for image analysis and increased speed and efficiency and then the fish can be beheaded in the first cutting steps. The present invention provides a more accurate method of positioning the pin-bones as the gutted fish is not beheaded when it is placed on the saddle, but this allows for better size determination of the fish prior to determining the cutting pattern of each fish. The method may use means such as a laser or a camera to detect the position of the fish on the conveyor and the size of the fish to determine or calculate the position of the pin-bones in the fish. The calculation of pin-bone position is based on the species and population of fish.

The apparatus and method of the present invention differ substantially from prior art methods and devices in several ways. Devices such as the one disclosed in U.S. Pat. No. 9,357,789 may use a sensor to determine the length of the fish and a control unit to determine the cuts of the rotating knife pairs. The shortcoming of this device is that such knife pars can only perform straight cuts, which demands broader cuts into the fillet and thereby waste of prime raw material, whereas the present apparatus may use either imaging for exact determination of the pin-bones in the fillet or use an image and position of a whole fish to calculate the position of the pin-bones based on species and sub-species of fish. The present apparatus can make precise cuts with a rotating water-jet device to leave as much meet in the fillet as possible. The prior art devices make dorsal cuts before filleting, whereas the present apparatus makes the pin-bone cuts prior to the dorsal cuts taking advantage of an intact fish which does not compromise the estimated or determined position of pin-bones in the flesh. Prior art methods also use beheaded fish, whereas the present method has the option of loading whole fish on the saddle. This has the advantage of a more accurate calculation of pin-bones using imaging means as compared to use beheaded fish. The present method and apparatus is not dependent on parallel and straight cutting pattern for the pin-bones and in combination with imaging devices such as x-ray or hyper spectral cameras, exact location of pin-bones can be made and custom made cuts can be performed following the pin-bone line.

The method of the present invention may use data obtained by one or more imaging means, such as, but not limited to a laser, X-ray, 2D camera, 3D camera or hyperspectral imaging device to position the fish on the conveyor, the computer and software determine the position of the fish on the conveyor and the position of the pin-bones in the fish.

The apparatus of the present invention is designed for mechanical filleting of fish and for removal of pin-bones from gutted fish while the fish is mounted on a conveyor of the filleting apparatus. The conveying device for advancing the gutted fish is provided with a saddle device for attaching and supporting the gutted fish through the process of pin-bone cuts and filleting. The apparatus comprises means for obtaining data on the position of the fish on the conveyor as well as the size of the fish and a computer to determine the position of the pin-bones in each fillet of each fish and to determine the cutting pattern for cutting out parts of abdominal flaps and removing pin-bones.

The abdominal flaps and pin bones are not separated from the fillet during filleting as in the prior art methods. The pin-bone cut and optionally beheading of the fish is performed prior to making dorsal and ventral cuts to start separating the fillet from the fish, which provides a more precise cut based on image data as the fillet is still fully attached to the backbone. Therefore, the pin-pones sit in a fixed position until the fillets are separated from the backbone/skeleton and the same goes for the abdominal flaps, so both the pin-bone strip and the abdominal flaps are attached to the fillet even after separation. The products of the filleting process therefore only require one transport from the filleting device and no human interaction. Furthermore, due to this, the pin-bone strip and the abdominal flap can both be skinned with the rest of the fillet saving time and resources and providing better quality side products. This pin-bone strip is separated from the fillet during skinning if a skinning device as placed downstream of the filleting device. The intact fillet is better suited for scraping the abdominal flaps as the fillets are separated from the backbone/skeleton increasing quality of this side product and saving time and human resources. By producing a fillet with both the pin-bone strip and the abdominal flaps are attached, more options for utilization are provided with respect to cuts and side or secondary products.

A system of the present invention provides an apparatus where gutted whole fish may be mounted onto a conveyor and beheading, pin-bone cuts, filleting, skinning and portioning can be performed based on one or more image analysis in a single apparatus without the human hand being involved. The system can automatically determine based on size, quality of fillets and demand in the market processing steps, batching and packing. The system provides better yield of primary raw material and better quality of side products increasing the value and quality of all the products from each fish.

The apparatus of the present invention has two or more cutting units, one for making pin-bone cuts and optionally to perform other cuts and the other for filleting the fish while the fish is positioned on the saddle of the conveyor. The first cutting unit comprises at least two water jet devices for separating or cutting out parts of abdominal flaps comprising the pin-bones while the second cutting unit is a more traditional filleting unit comprising a set of cutting knifes and/or water jet devices for separating the fillets from the backbone. Although the gutted fish is supported by the saddle and attached to it by tags or hooks or other gripping features on the saddle, the fish is further supported or held in a centred position by a holding device while it is passing through the cutting unit. As mentioned above the traditional filleting machines use a set of circular blades from above and below to separate the fillets from the backbone of a beheaded and gutted fish. The device of the present invention can receive a gutted fish with the head intact and the computing device uses the size or other characteristics of the fish and the position of the whole fish to determine cutting patterns. Moreover, the apparatus of the present invention can use additional knifes and the water-jet devices to perform additional cuts such as beheading and to separate the clavicle from the beheaded fish as well as to first separate the cheek from the fish before beheading.

The new method and apparatus can further be provided with imaging means after the filleting station to inspect and/or analyse the fillets before further processing. By using imaging devices such as a 2D- or 3D camera, the quality of the fillets can be determined for selection of fillets into two or more categories.

The new method is performed by a combination of knifes, such a rotating knife blades, and water-jet devices to perform beheading, removing the clavicle and filleting a gutted fish on the same conveyor without handling the fish. By determining the position of the fish on the conveyor and the size of the fish it is possible to determine and calculate the position of the pin-bones in the fillet using reference based cutting patterns which rely on knowing the species and the population of the species being processed. This is possible because when filleting fish like cod, a population in certain areas have same proportional building features so the position of the pin-bones in a cod from a certain area of a certain size can be accurately calculated.

The method and device of the present invention uses a water-jet device head and nozzle for some of the cutting. By starting the filleting with a rotating knife and then continuing the filleting with a water-jet the splashing water and the mince or surimi is collected by a suction device positioned behind the water-jet.

The new device can have alternately two cutting units positioned next to one another, in the same housing, or spaced apart to first perform the pin-bone cuts as well as other primal cuts, such as beheading and/or removing the cheeks and clavicle by a first cutting unit, and the secondly performing the filleting process in a second housing by a second cutting unit.

The device and method of the present invention is further suitable for aligning the fillets up for skinning at the end of the conveyor, thereby performing most of the processing steps needed without any human handling after the gutting and arranging the gutted fish on the conveyor. The combination of one or more of the following embodiments provide the solutions presented herein: a) use of mounting a gutted fish the head intact onto a saddle of a conveyor and the use of positioning of the fish and knowing the size of the fish on the conveyor to determine the anatomy of the fish including pin-bone position as well as the position of the head and the clavicle, and b) the combination of knife blades and water-jets to remove the cheeks, the head and the clavicle before filleting, which provides the improved device and method of the present invention resulting in increased yield of fish during the processing of fish.

One of the challenges in modern food industry is to reduce handling of food and to increase automation and yield in processing of raw materials such as fish. The device and method of the present invention is very suitable for taking whole gutted fish and delivering a fillet onto a skinning device.

It is an object of the present invention to overcome and/or ameliorate the aforementioned drawbacks of the prior art and to provide an improved and/or alternative and/or additional method or device for It is one preferred object of the present invention to provide a method and device preferably designed to mechanically fillet and remove pin-bones from gutted whole fish using size information to determine cutting pattern to remove pin-bones from the fish, while the fish is mounted on the filleting device. Another preferred object of the present invention is to provide a device with hyperspectral imaging means for determining the position of pin-bones in the flesh. An important aspect of the present invention is providing a method for beheading, removing pin-bones and filleting a whole fish while the fish is mounted on a saddle of a filleting machine without additional handling and using calculations based on the size of the fish and information on species and population to locate head and pin-bones and make the processing cuts for beheading, removing pin-bones and filleting the whole fish.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by an apparatus for mechanically filleting and for removing pin-bones from gutted fish. The apparatus comprises i) a first conveying means for advancing the gutted fish in conveying direction, where the first conveying means further comprising means for attaching and supporting the gutted fish to the conveying means, ii) a first imaging means for obtaining image data and position data of the fish on the first conveying means, iii) computing means, iv) a first cutting unit comprising a set of water-jet devices for making cuts in the abdominal flaps along the pin-bones in as the fish is being advanced on the first conveying means, v) a second cutting unit comprising two pairs of cutting knifes for making dorsal and ventral cuts into the fish as the fish is being advanced on the first conveying means, and vi) a third cutting unit comprising a severing knife for detaching the fillets from the backbone of the fish by making cuts along the dorsal fins of the fish. The first imaging means and the computing means determine the position of the fish on the first conveying means and the position of the pin-bones in each fillet of each fish and determine a cutting pattern for the set of water-jet devices to make cuts in the abdominal flaps along the pin-bones. Furthermore, the first cutting unit is positioned in front of the second cutting unit in order to perform cuts along the pin-bones before the second cutting unit starts separating the fillets from the backbone.

apparatus for mechanically filleting and for removing pin-bones from gutted fish, where the device comprises i) an endless conveyor for advancing the gutted fish in the conveying direction and where the conveying means further comprises means for attaching and supporting said gutted fish to the conveying means, ii) means for obtaining data on the position of the fish on the conveying means and the size of the fish, iii) computing means, iv) a first cutting unit comprising at least two water jet devices for separating or cutting out parts of abdominal flaps and removing pin-bones in the first cutting unit, v) a second cutting unit comprising a set of cutting knifes and/or water-jet devices for separating the fillets from the backbone. The apparatus uses the means for obtaining data on the position of the fish on the conveying means and the size of the fish and the computing means to determine the position of the pin-bones in each fillet of each fish and determine the cutting pattern of the at least two water-jet devices for separating or cutting out parts of abdominal flaps and removing pin-bones in the first cutting unit.

Another preferred object of the present invention is solved by a method for processing gutted fish including mechanically filleting and removing pin-bones from the fish, where the method comprises the steps of:

a) mounting the gutted fish onto a saddle for attaching and supporting said gutted fish on a first conveying means,
b) conveying the gutted fish in conveying direction,
c) obtaining first image data and position data of each fish on the first conveying means using a first imaging means,
d) processing the first image data using computing means,
e) conveying the gutted fish to a first cutting unit for making cuts in the abdominal flaps along the pin-bones as the fish is being advanced on the first conveying means 3 further comprising a set of water-jet devices.
f) conveying the gutted fish to a second cutting unit for making dorsal and ventral cuts into the fish as the fish is being advanced on the first conveying means 3 further comprising two pairs of cutting knifes,
g) conveying the gutted fish to a third cutting unit for detaching the fillets from the backbone of the fish by making cuts along the dorsal fins of the fish using a separating cutting tool,
h) receiving fillets after separation from the backbone in the third cutting unit on a second conveying means, and
i) obtaining second image data of the fillets using a second imaging means.

Furthermore, the method comprises determining the position of the fish on the first conveying means and the position of the pin-bones in each fillet of each fish by the computing means based on the first image data and determining a cutting pattern for the set of water-jet devices to make cuts in the abdominal flaps along the pin-bones, and performing cuts along the pin-bones using the first cutting unit prior to separating the fillets from the backbone using the second cutting unit.

Another preferred object of the present invention provides a system for processing gutted fish including mechanically filleting and for removing pin-bones from the fish, where the system comprises:

i. mounting the gutted fish onto means for attaching and supporting said gutted fish on a first conveying means and conveying the gutted fish in conveying direction,
ii. first imaging means for obtaining first image data and position data of each fish on the first conveying means,
iii. computing means for performing image analysis of the image data,
iv. a first cutting unit comprising a set of water-jet devices for making cuts in the abdominal flaps along the pin-bones as the fish is being advanced on the first conveying means,
v. a second cutting unit comprising two pairs of cutting knifes for making dorsal and ventral cuts into the fish as the fish is being advanced on the first conveying means,
vi. a third cutting unit comprising a separating cutting tool for detaching the fillets from the backbone of the fish by making cuts along the dorsal fins of the fish,
vii. second conveying means for receiving fillets after separation from the backbone in the third cutting unit, and
viii. second imaging means for obtaining image data of the fillets.

The system further comprises determining the position of the fish on the first conveying means and the position of the pin-bones in each fillet of each fish by the computing means based on the first image data and determine a cutting pattern for the set of water-jet devices to make cuts in the abdominal flaps along the pin-bones.

Furthermore, the first cutting unit is positioned in front of the second cutting unit in order to perform cuts along the pin-bones before the second cutting unit starts separating the fillets from the backbone.

Another preferred object of the present invention is solved by a method for mechanically filleting and for removing pin-bones from gutted fish. The method comprises the steps of:
a) placing the gutted fish on a saddle for attaching and supporting said gutted on a conveying means,
b) conveying the gutted fish in conveying direction,
c) obtaining data on the position of the fish on the conveying means and the size of the fish,
d) processing the data by a computing means,
e) conveying the gutted fish to a first cutting unit for separating or cutting out parts of abdominal flaps and removing pin-bones by water jet beams.
f) conveying the gutted fish to a second cutting unit for separating the fillets from the backbone by a set of cutting knifes and/or water jet devices, The method further comprises using the means for obtaining data on the position of the fish on the conveying means and the size of the fish and the computing means to determine the position of the pin-bones in each fillet of each fish and to determine the cutting pattern for the at least two water jet devices for separating or cutting out parts of abdominal flaps and removing pin-bones in the first cutting unit.

One of the preferred objects of the present invention is solved by an apparatus for mechanically filleting and for removing pin-bones from gutted fish, where the device comprises i) an endless conveyor for advancing the gutted fish in conveying direction and where the conveying means further comprises means for attaching and supporting said gutted fish to the conveying means, ii) hyperspectral imaging means, iii) computing means, iv) a first cutting unit comprising at least two water jet devices for separating or cutting out parts of abdominal flaps and removing pin-bones in the first cutting unit, v) a second cutting unit comprising a set of cutting knifes and/or water jet devices for separating the fillets from the backbone. The apparatus uses the hyperspectral imaging means and the computing means to determine the position of the pin-bones in each fillet of each fish and determine the cutting pattern of the at least two water jet devices for separating or cutting out parts of abdominal flaps and removing pin-bones in the first cutting unit.

Another preferred object of the present invention is solved by a method for mechanically filleting and for removing pin-bones from gutted fish. The method comprises the steps of:
a) placing the gutted fish on a saddle for attaching and supporting said gutted on a conveying means,
b) conveying the gutted fish in conveying direction,
c) obtaining data on the position of the fish on the conveying means and the size of the fish,
d) processing the data by a computing means,
e) conveying the gutted fish to a first cutting unit for separating or cutting out parts of abdominal flaps and removing pin-bones by water jet beams,
f) conveying the gutted fish to a second cutting unit for separating the fillets from the backbone by a set of cutting knifes and/or water jet devices, and
g) obtaining images by a hyperspectral imaging means for inspecting the fillets after the have been separated from the backbone.

The method further comprises using the means for obtaining data on the position of the fish on the conveying means and the size of the fish and the computing means to determine the position of the pin-bones in each fillet of each fish and to determine the cutting pattern for the at least two water jet devices for separating or cutting out parts of abdominal flaps and removing pin-bones in the first cutting unit, and wherein the hyperspectral imaging means determine the amount of TVB-N in the fillets.

Another preferred object of the present invention is solved by an apparatus for mechanically filleting and for removing pin-bones from gutted fish, where the device comprises i) an endless conveyor for advancing the gutted fish in conveying direction and where the conveying means further comprises means for attaching and supporting said gutted fish to the conveying means, ii) means for obtaining data on the position of the fish on the conveying means and the size of the fish, iii) computing means, iv) a first cutting unit comprising at least two water jet devices for separating or cutting out parts of abdominal flaps and removing pin-bones in the first cutting unit, v) a second cutting unit comprising a set of cutting knifes and/or water jet devices for separating the fillets from the backbone, and vi) a hyperspectral imaging means for inspecting the fillets after the have been separated from the backbone. The apparatus uses the means for obtaining data on the position of the fish on the conveying means and the size of the fish and the computing means to determine the position of the pin-bones in each fillet of each fish and determine the cutting pattern of the at least two water jet devices for separating or cutting out parts of abdominal flaps and removing pin-bones in the first cutting unit, and wherein the hyperspectral imaging means determine the amount of TVB-N in the fillets.

In the present context the terms "fish" or "gutted fish" refers to freshly slaughtered and gutted or gutted, frozen and thawed fish, which is then to be mounted on a filleting machine.

In the present context the term "TVB-N" refers to Total Volatile Bases-Nitrogen and relates to quantification of the total amount of volatile bases such as TMA (trimethylamine), DMA (dimethylamine), FA (Formaldehyde), ammonia and other volatile nitrogen compounds.

In an embodiment of the present invention the first cutting unit is positioned near the second cutting unit.

In an embodiment of the present invention, the third cutting unit comprises a pair of cutting knifes for making dorsal cuts through the skin of the fish, and a water jet device for making dorsal cuts for separating the fillets from the backbone.

In an embodiment of the present invention, the apparatus further comprises a second conveyor for receiving fillets as they are separated from the backbone.

In an embodiment of the present invention, the apparatus further comprises a scraper device positioned near or below the third cutting unit for scraping the belly flap of the fillet as it is pulled off the backbone of the fish.

In an embodiment of the present invention, the scraper device is a guiding plate to guide the fillet onto the second conveyor with the skin-side facing down.

In an embodiment of the present invention, the first imaging means comprises one or more of an x-ray device a 2D camera, a 3D camera and hyper spectral imaging means.

In an embodiment of the present invention, the means for separating the head from the fish in the first cutting unit is a knife 12 and/or a water-jet 9.

In an embodiment of the present invention, the apparatus further comprises holding means 13 for securing the fish during cutting.

In an embodiment of the present invention, the holding means is controlled by a hydraulic jack for controlled support of the fish on the saddle.

In an embodiment of the present invention, the first cutting unit 7 is positioned near the second cutting unit 9.

In an embodiment of the present invention, the holding means 13 is the same for the first 7 and the second 9 cutting unit.

In an embodiment of the present invention, the first cutting unit 7 is separate from the second cutting unit 9 and wherein the first cutting unit is before or in front of the second cutting unit.

In an embodiment of the present invention, the means for attaching and supporting said gutted fish on the conveying means is a saddle 4 with gripping means 14.

In an embodiment of the present invention, a suction device is positioned behind the water beam to retrieve the cutting fluid after cutting and any tissue debris (mince) for collection.

In an embodiment of the present invention, the head is separated from the fish in the first cutting unit by a knife and/or a waterjet.

In an embodiment of the present invention, the clavicle is separated from the fish in the first cutting unit.

In an embodiment of the present invention, the cheek is separated from the fish head in the first cutting unit.

In an embodiment of the present invention, a pin-bone strip is formed in each fillet by two parallel and simultaneous cuts by the first cutting unit leaving the pin-bone strip and the abdominal flap attached to the rest of the fillet on the saddle.

In an embodiment of the present invention, a suction is applied behind the water jet (beam) to retrieve the cutting fluid and any tissue debris after cutting for collection.

In an embodiment of the present invention, the system further comprises a scraper tool positioned near or below the third cutting unit for scraping the abdominal flap of the fillet as it is pulled off the backbone of the fish.

In an embodiment of the present invention, the speed of each conveying means can be independently controlled and regulated such that individual cutting and processing steps can be performed at different speed.

In an embodiment of the present invention, the scraper tool further comprises guiding means for guiding each fillet onto the second conveyer with the skin side down.

In an embodiment of the present invention, the first, second and third cutting units deliver fillets with the pin-bone strip and the abdominal flaps attached.

In an embodiment of the present invention, the system further comprises a skinning device to skin the fillets.

In an embodiment of the present invention, the computing means determines one or more characteristics of the fillets based on the second image data.

In an embodiment of the present invention, the one or more characteristics of the fillets comprises one or more of, size, shape, colour, weight, damages, cutting faults, quality parameters such as TVB-N chemicals.

In an embodiment of the present invention, the computing means determines further processing steps based on the second image data.

In an embodiment of the present invention, the computing means performs batching steps and determines destination based on the second image data.

In an embodiment of the present invention, the computing means uses the second image data and information on markets and demands to determine one or more of: processing steps, batching steps, destination and/or packing.

In an embodiment of the present invention, the system further comprises further imaging means to obtain third image data and wherein the third image data and information on markets and demands to determine one or more of: processing steps, batching steps, destination and/or packing.

In an embodiment of the present invention the clavicle is separated from the fish in the first cutting unit.

In an embodiment of the present invention the cheek is separated from the fish head in the first cutting unit.

In an embodiment of the present invention each row of pin-bones and the adjacent tissue is cut or separated from the fish by two parallel and simultaneous cuts by water-jet beams.

In an embodiment of the present invention a suction is applied behind the water beam to retrieve the cutting fluid and any tissue debris after cutting for collection.

In an embodiment of the present invention the rotating knifes make the first cut into the fish to start the separation of the fillet from the backbone, but then the water-jet device continues the cutting and separation of the fillet from the backbone. In such an embodiment a suction is applied behind the water beam to retrieve the cutting fluid and any tissue debris after cutting for collection.

In an embodiment of the present invention the pectoral fin is used to provide gripping for the guiding means for holding the fish stable and centred during cutting for beheading.

In an embodiment of the present invention a slide or collection channel is positioned under the apparatus for collecting mince and collagen.

In an embodiment of the present invention the pin-bone strip and/or the abdominal flap are separated from the fillet on the saddle.

In an embodiment of the present invention the at least two water jet devices are positioned on each side of the conveyor where each water jet device comprises one or more nozzles to perform cuts as the fish is transported on the saddle past the first or second cutting unit and wherein the water jet device comprises a rotating block with one or more nozzles.

In an embodiment of the present invention the term 2D camera or 2D imaging means refers to a traditional RGB camera. In such an embodiment, the reflectance of the fish is captured on three light bands, mimicking the way the human eye captures light, therefore the image of the fish can be utilized to determine the size of the fish, and thereby utilizing a population model to determine the location of major bones in the fish. Furthermore, and in addition to bone position, a visual quality assessment can be performed, analysing visual (to the human eye) bruises or defects. When the intention is to use the image data solely to position bones, the image is captured/obtained before the cutting procedure is carried out. When, on the other hand, the intention is to only use the imaging data for quality assessment purposes, the images can be captured at any point post cutting.

In an embodiment of the present invention the term 3D camera or 3D imaging means refers to a device for obtaining data about the fish being processed. This setup can be used both for bone positioning as well as quality assessment. A 3D point is used to estimate the size of the fish in high detail. This size estimation enables the computer to compare the size against a population model of the fish and thereby roughly position e.g. bones in the fish. This positioning data is then sent onwards to the cutting coordination mechanism. For the quality assessment both the point cloud as well as potentially light capturing sensors can be used. The light sensors are most enable detection of colour-based defects and bruises while the point cloud enables detection of potential topological defects and deformations. If the intention is to use the system only for quality assessment, the imaging data can be captured post-cutting.

In an embodiment of the present invention the term "hyperspectral camera" or "hyperspectral imaging means" refers to a system that can be utilized for both profiling cuts of the fish, as well as quality assessment of the product. As hyperspectral cameras capture light on multiple wavelengths (not necessarily the same as the human eye) that enables the camera to detect light waves that might penetrate of even pass through the fish entirely, depending on the wavelengths and lamination technique in question. This enables the computer system to receive accurate information about the exact position of the bones in the fish being processed and removes the need to pass the measurements through any statistical models. The computer system can then pass the information further onwards to the cutting mechanism. For quality assessment, the hyperspectral cameras enable "fingerprints" of certain chemicals to be detected through light-absorption spectra. This way for example TVB-N chemicals which build up in the fish as it gets older can be detected and the fish's shelf life can be estimated. The hyperspectral cameras would also enable the nutritional contents of the fish to be estimated through the light-absorption spectra. If the intention is to only utilize the camera for quality assessment purposes, the camera can be positioned post cut.

DESCRIPTION OF VARIOUS EMBODIMENTS

The present invention will become more fully understood from the detailed description given hereinafter and the accompanying drawings which are given by way of illustration only, and thus, are not limitative of the present invention, and wherein.

Figure 1:
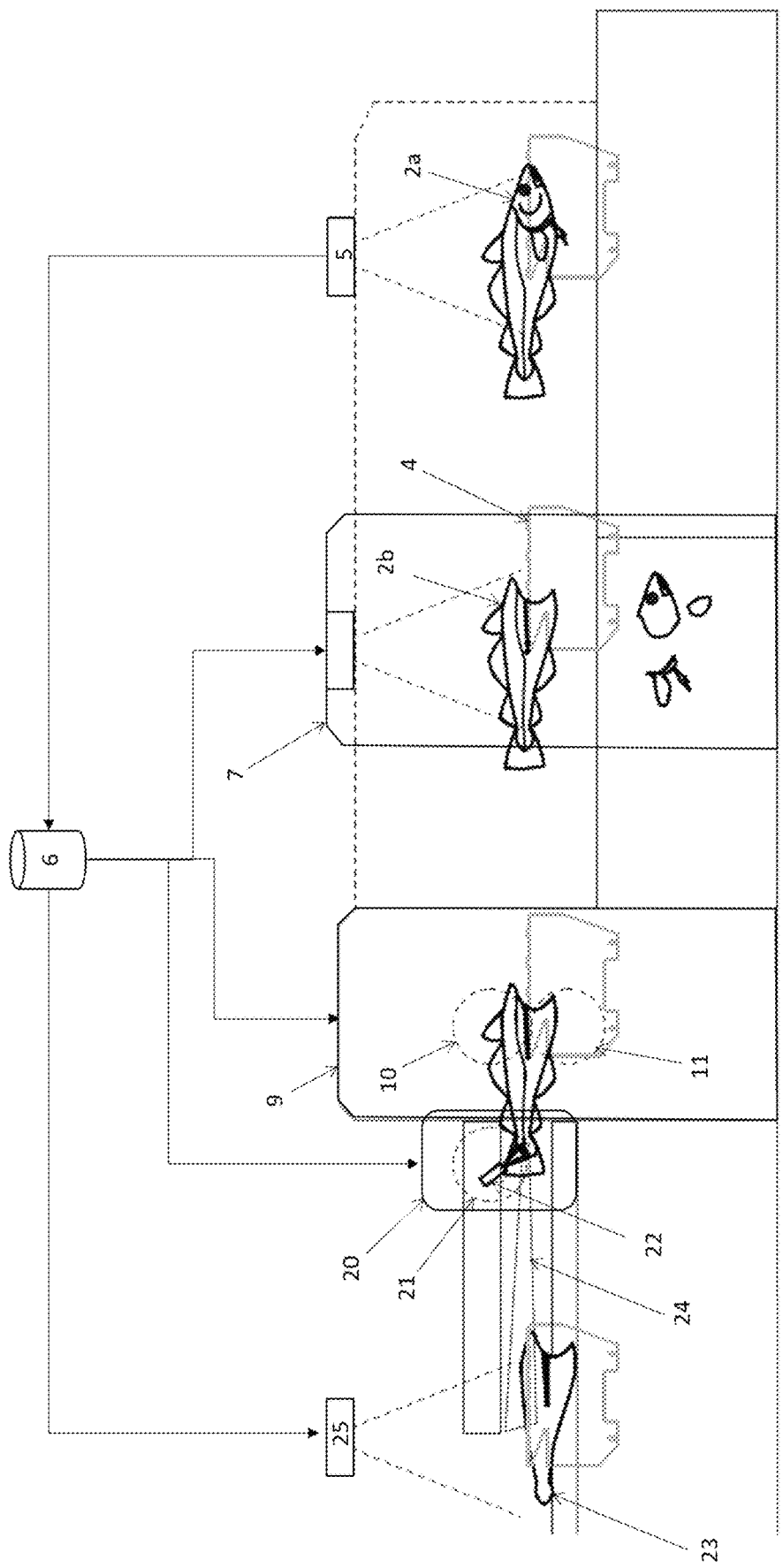
FIG. 1 is an overview of an apparatus of the invention.

FIG. 1 shows an overview of an apparatus according to one embodiment of the present invention. The figure shows an apparatus 1 for mechanically filleting fish 2 and for removing the pin-bones from gutted fish while on the filleting machine. The apparatus shown in FIG. 1 has a conveying device 3 for advancing the gutted fish in conveying direction X. The conveying device is an endless chain conveyor 3 having a plurality of saddles 4 with gripping means attached to the conveying device for attaching and supporting the gutted fish to the conveying device during transportation and processing. In the embodiment shown in FIG. 1, the filleting apparatus has two separated cutting units. The apparatus further has a first imaging means for obtaining data on the position of the fish and the size of the fish 5 on the conveying means 3 and optionally the position of the pin bones. The imaging means 5 and a computing device 6 further determine the position of the pin-bones in each fillet of each fish and determine the cutting pattern of the at least two water-jet devices for separating or cutting out parts of abdominal flaps and removing pin-bones in the first cutting unit based on imaging and/or calculations. The device has two defined cutting units defined and, in this embodiment, the two cutting units are spaced apart above the conveyor. A first cutting unit 7 is positioned before the second cutting unit 9. Each cutting unit has guiding or holding means (not shown) for holding and keeping the fish centred during cutting. The first cutting unit 7 comprises water jet devices 8 for separating or cutting out parts of abdominal flaps and removing pin-bones from the fish 2a in the first cutting unit. In this embodiment the first cutting unit further comprises a knife 12 for beheading the fish. The knife blade 12 can be a rotating knife which cuts halfway through the bone and a water-jet may cut the rest to remove the head from the gutted fish 2b. The second cutting unit 9 has a set of rotating knife blades 10/11 for making dorsal and ventral cuts into the fillets. The figure also shows a third cutting unit 20 further comprising a pair or rotating blades 21 and water-jet nozzles 22 to separate the fillet 23 from the skeleton. Thereafter a scraper device 24 is shown which scrapes the abdominal flaps as the third cutting unit severs the fillet and pulls it off the backbone. Finally a second imaging means is shown to obtain data on the fillets 23

Figure 2:
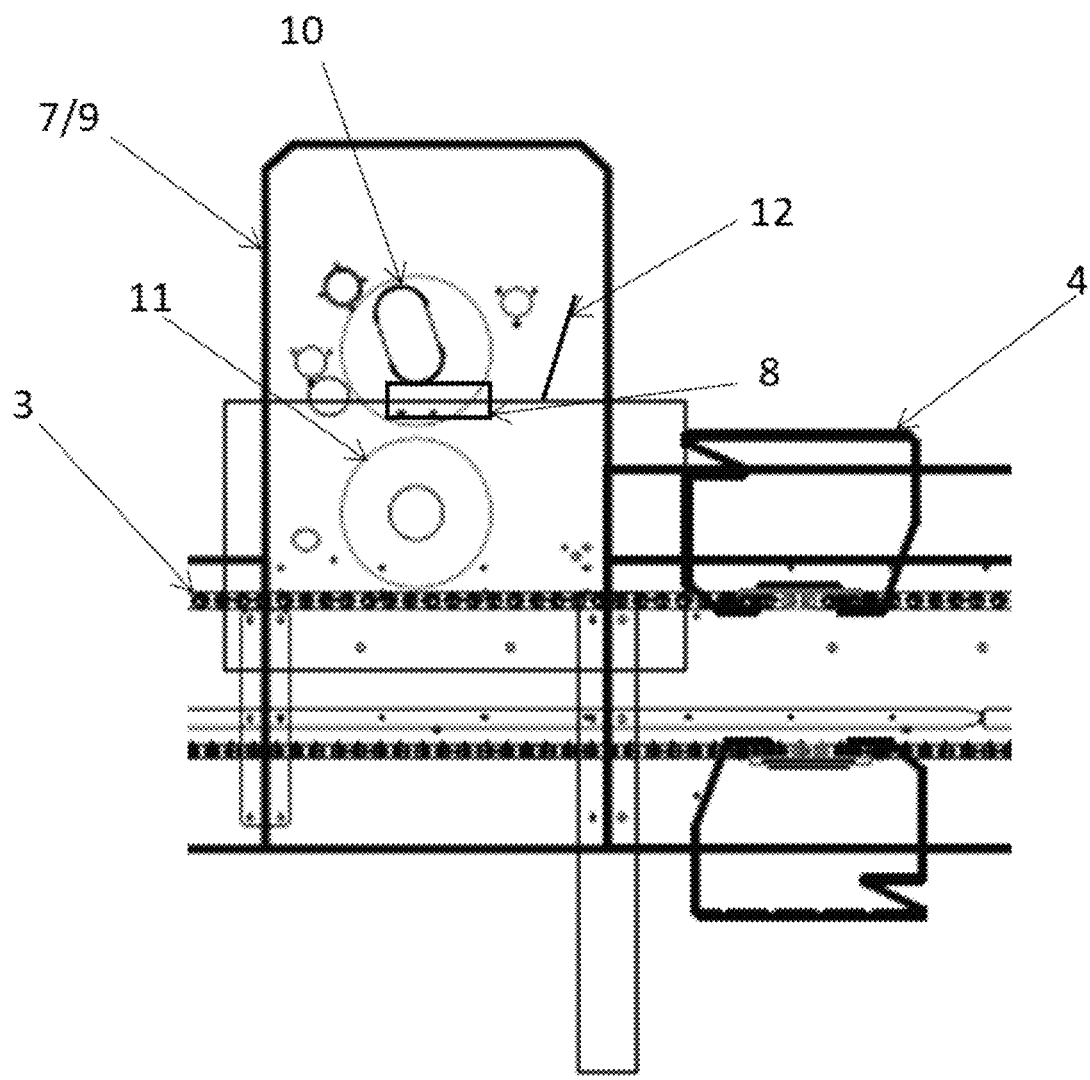
FIG. 2 is side view of a cutting unit according to one embodiment.

FIG. 2 shows the cutting portion of an apparatus according to the present invention, where the first 7 and the second 9 cutting units are positioned near one another and in the same housing. The knife blade 12 for beheading the fish is positioned before the water-jets and the set of rotating knife blades 10/11 for separating the fillets from the backbone.

Figure 3:
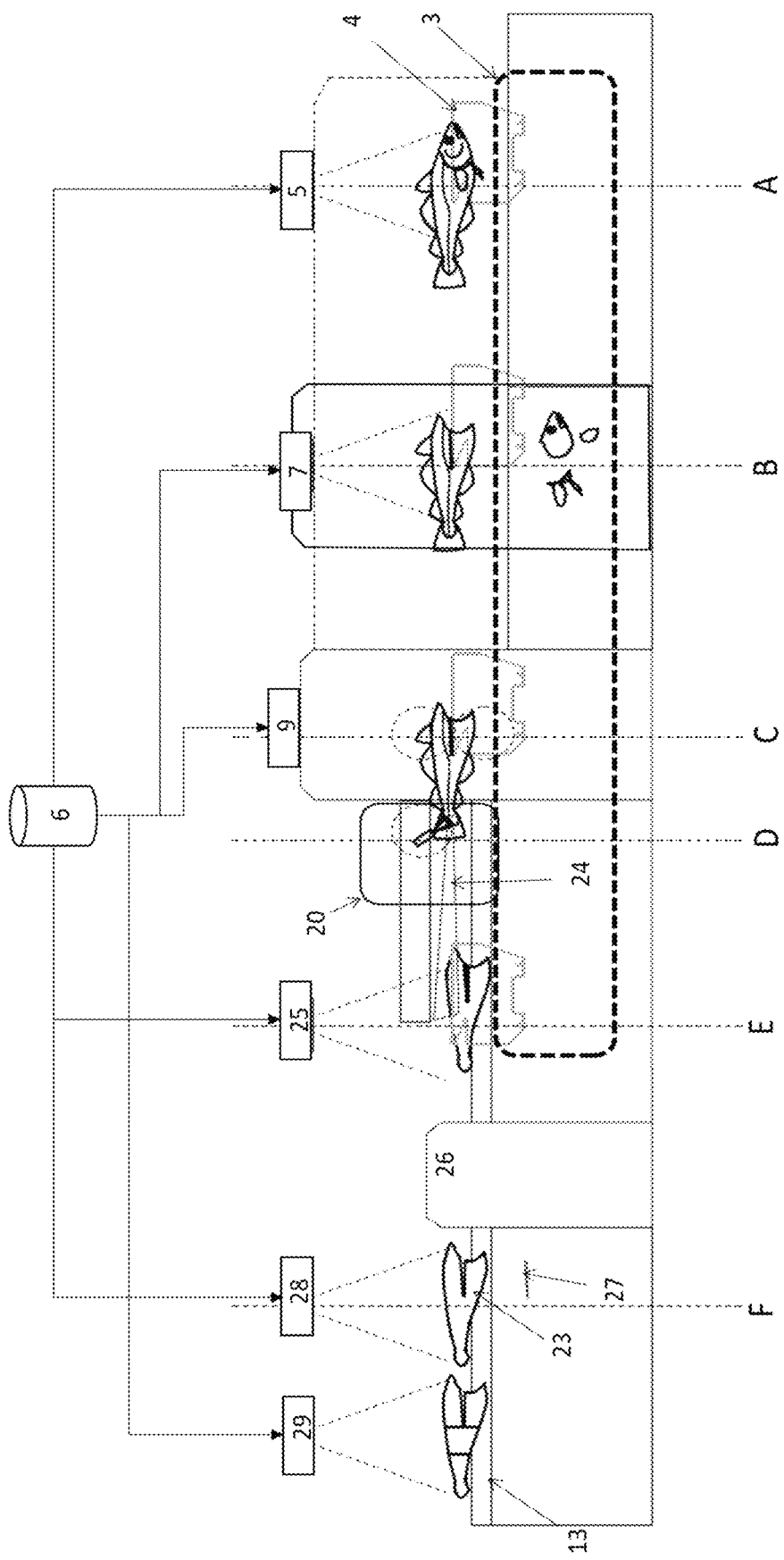
FIG. 3 shows a system according to the invention.

FIG. 3 shows an embodiment of a system according to the present invention where gutted whole fish is mounted on a saddle of a first conveyor and portioned fillets are delivered on a second conveyor 13 in a fully automatic manner. A first imaging means obtains data on whole fish and a computing device 6 determines a cutting pattern. The first cutting unit 7 performs pin-bone cuts and separates the head, chin fish and collarbone from the rest of the fish. The second cutting unit 9 performs dorsal and ventral cuts in the fish and a third cutting unit 20 uses a pair or rotating blades 21 and/or water jet nozzle 22 to separate the fillet 23 from the skeleton. A second imaging means 25 obtains second image data of the fillets and the computing means 6 determines further processing steps and may perform batching steps based on the data. A skinning device 26 skins the fillet and in this embodiment the pin-bone strip 27 is detached during the skinning. A third imaging device 28 may obtain third data on quality or other characteristics, such as size, shape, weight also to be used for determining further processing steps and/or batching. The drawing also indicates a portioning device on the second conveyor belt for automatic portioning of the fillets 23.

Figure 4:
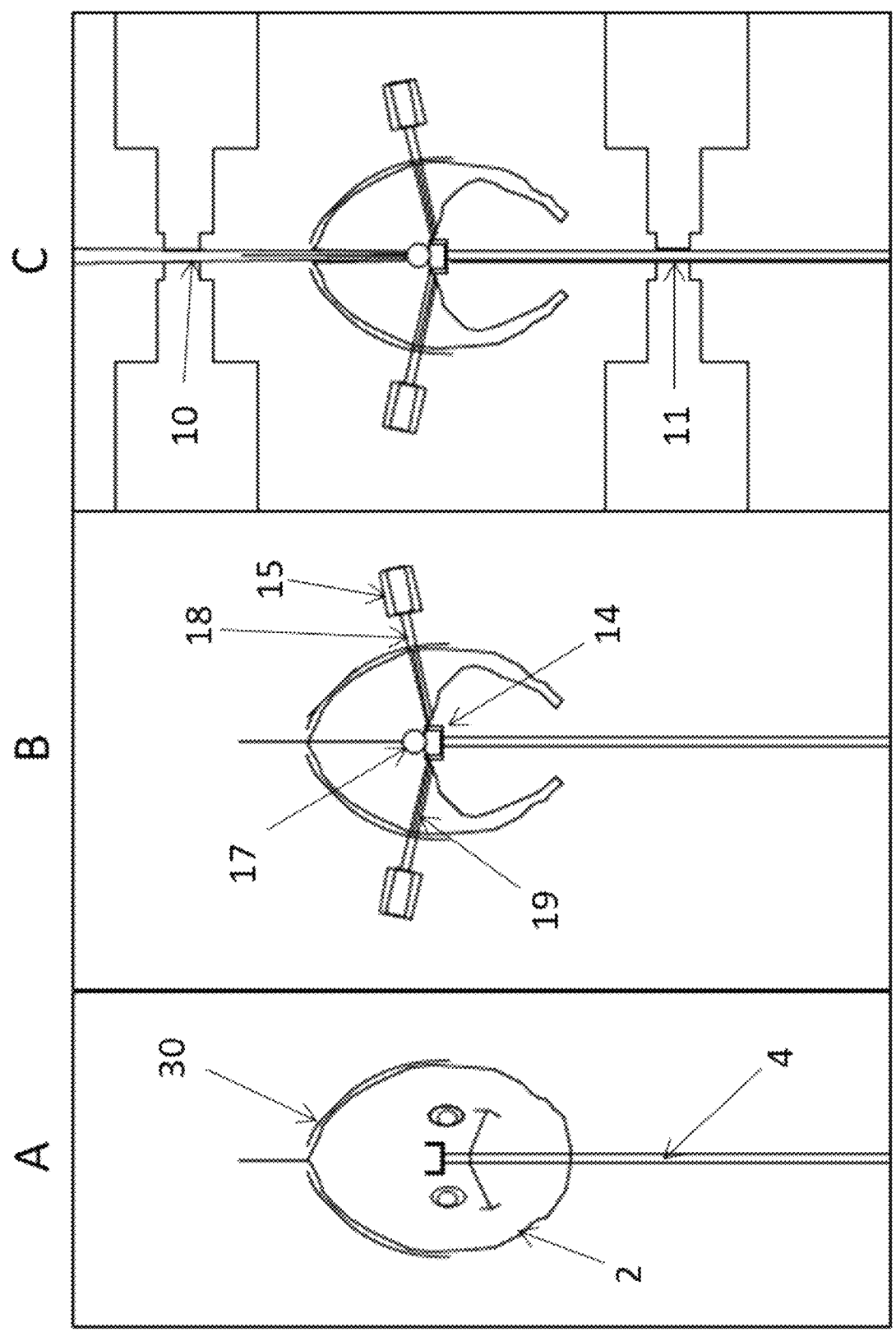
FIG. 4 shows a cross section of the fish in various positions in the apparatus of the invention.

FIG. 4 is transactional front view of the system shown and indicated with dotted lines in FIG. 3 following the fish through the apparatus of the invention. FIG. 4A shows a fish mounted on a saddle 4 of the first conveyor. FIG. 4B shows the fish in the first cutting unit where the head has been separated from the fish 2 and where the gripping means 14 of the saddle 4 is shown and how the fish sits on the gripping means 14 with the tags attaching to the abdomen on each side of the backbone 17. The drawing shows the back knifes 10 cutting down on each side of the back fins (not shown). The rotating water block 15 of the water jet device is shown projecting a water jet 18 through the skin and the flesh of the fish 2 to remove the pin bones 19. In FIG. 4C this fish is in the second cutting unit where a set of rotating knife blades 10/11 are making dorsal and ventral cuts into the fish. In FIG. 4D the fish is in the third cutting unit where a rotating blade and a nozzle 22 separate the fillet from the backbone. The figure also shows the scraper tool 24, which scrapes the abdominal flaps as the third cutting unit severs the fillet and pulls it off the backbone. In FIGS. 4E and 4F the fillet 23 is positioned on the second conveyor 13, where in FIG. 4F the fillet has been skinned.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An apparatus (1) for mechanically filleting and for removing pin-bones (19) from gutted fish (2), said apparatus comprising:
a first conveying means (3) for advancing the gutted fish (2) in conveying direction, said first conveying means (3) further comprising means for attaching and supporting said gutted fish (2) to the conveying means (3),
a first imaging means (5) for obtaining image data and position data of the fish (2) on the first conveying means (3),
computing means (6),
a first cutting unit (7) comprising a set of water-jet devices (8) for making cuts in the abdominal flaps along the pin-bones (19) in as the fish (2) is being advanced on the first conveying means (3) (and means for separating the head from the fish, with or without the clavicle,
a second cutting unit (9) comprising two pairs of cutting knifes (10/11) for making dorsal and ventral cuts into the fish as the fish is being advanced on the first conveying means (3),
a third cutting unit (20) comprising a severing knife for detaching the fillets (23) from the backbone of the fish by making cuts along the dorsal fins of the fish (2),
characterized in that said first imaging means (5) and the computing means (6) determine the position of the fish on the first conveying means (3) and the position of the pin-bones (19) in each fillet (23) of each fish (2) and determine a cutting pattern for the set of water-jet devices (8) to make cuts in the abdominal flaps along the pin-bones (19), and in that the first cutting unit (7) is positioned in front of the second cutting unit 9) in order to perform cuts along the pin-bones (19) before the second cutting unit (9) starts separating the fillets (23) from the backbone.

2. The apparatus (1) according to claim 1, wherein the third cutting unit (20) comprises a pair of cutting knifes (21) for making dorsal cuts through the skin of the fish, and a water jet device (8) for making dorsal cuts for separating the fillets (23) from the backbone.

3. The apparatus (1) according to claim 1, wherein the apparatus further comprises a second conveyor (13) for receiving fillets (23) as they are separated from the backbone.

4. The apparatus (1) according to claim 1, wherein the apparatus further comprises a scraper device (24) positioned near or below the third cutting unit (20) for scraping the belly flap of the fillet (23) as it is pulled off the backbone of the fish.

5. The apparatus (1) according to claim 1, wherein the scraper device (24) is a guiding plate to guide the fillet (23) onto the second conveyor with the skin-side facing down.

6. The apparatus (1) according to claim 1, wherein the first imaging means (5) comprises one or more of an x-ray device a 2D camera, a 3D camera and hyper spectral imaging means.

7. The apparatus (1) according to claim 1, wherein the means for separating the head from the fish in the first cutting unit is a knife (12) and/or a water-jet 9).

8. The apparatus (1) according to claim 1, wherein the apparatus further comprises holding means 13 for securing the fish during cutting.

9. The apparatus (1) according to claim 1, wherein the holding means (13) is controlled by a hydraulic jack for controlled support of the fish (2) on a saddle (4).

10. The apparatus according to claim 9, wherein the holding means (13) is the same for the first 7 and the second 9 cutting unit.

11. The apparatus according to claim 1, wherein the first cutting unit (7) is positioned near the second cutting unit (9).

12. The apparatus according to claim 1, wherein the first cutting unit (7) is separate from the second cutting unit (9) and wherein the first cutting unit (7) is before or in front of the second cutting unit (9).

13. The apparatus according to claim 1, wherein the means for attaching and supporting said gutted fish on the conveying means is a saddle (4) with gripping means (14).

14. The apparatus according to claim 1, wherein a suction device is positioned behind a water beam to retrieve the cutting fluid after cutting and any tissue debris (mince) for collection.

15. A method for processing gutted fish including mechanically filleting and removing pin-bones (19) from the fish, the method comprising the steps of:
   a) mounting the gutted fish (2) onto a saddle (4) for attaching and supporting said gutted fish on a first conveying means (3),
   b) conveying the gutted fish (2) in conveying direction,
   c) obtaining first image data and position data of each fish (2) on the first conveying means (3) using a first imaging means (5),
   d) processing the first image data using computing means (6),
   e) conveying the gutted fish (2) to a first cutting unit (7) for making cuts in the abdominal flaps along the pin-bones (19) as the fish is being advanced on the first conveying means (3) further comprising a set of water-jet devices 8),
   f) conveying the gutted fish (2) to a second cutting unit (9) for making dorsal and ventral cuts into the fish as the fish (2) is being advanced on the first conveying means (3) further comprising two pairs of cutting knifes (10/11),
   g) conveying the gutted fish (2) to a third cutting unit (20) for detaching the fillets (23) from the backbone of the fish by making cuts along the dorsal fins of the fish using a separating cutting tool (24),
   h) receiving fillets (23) after separation from the backbone in the third cutting unit (20) on a second conveying means (13), and
   i) obtaining second image data of the fillets (23) using a second imaging means (25),
   characterized in determining the position of the fish on the first conveying means (3) and the position of the pin-bones (19) in each fillet (23) of each fish (2) by the computing means (6) based on the first image data and determining a cutting pattern for the set of water-jet devices (8) to make cuts in the abdominal flaps along the pin-bones (19), and
   in that performing cuts along the pin-bones (19) using the first cutting unit prior to separating the fillets (23) from the backbone using the second cutting unit 9.

16. The method according to claim 15, wherein the head is separated from the fish (2) in the first cutting unit (7) by a knife (12) and/or a waterjet.

17. The method according to claim 15, wherein the clavicle is separated from the fish (2) in the first cutting unit (7).

18. The method according to claim 15, wherein the cheek is separated from the fish (2) head in the first cutting unit (7).

19. The method according to claim 15, wherein a pin-bone strip (27) is formed in each fillet (23) by two parallel and simultaneous cuts by the first cutting unit (7) leaving the pin-bone strip (27) and the abdominal flap attached to the rest of the fillet (23) on the saddle (4).

20. The method according to claim 15, wherein a suction is applied behind the water jet (beam) to retrieve the cutting fluid and any tissue debris after cutting for collection.

21. A system for processing gutted fish including mechanically filleting and for removing pin-bones (19) from the fish, the system comprising:
   a first conveying means (3) for attaching and supporting said gutted fish (2) and conveying the gutted fish (2) in conveying direction,
   first imaging means (5) for obtaining first image data and position data of each fish on the first conveying means (3),
   computing means (6) for performing image analysis of the image data,
   a first cutting unit (7) comprising a set of water-jet devices (8) for making cuts in the abdominal flaps along the pin-bones (19) as the fish is being advanced on the first conveying means (3),
   a second cutting unit (9) comprising two pairs of cutting knifes (10/11) for making dorsal and ventral cuts into the fish as the fish is being advanced on the first conveying means (3),
   a third cutting unit (20) comprising a separating cutting tool for detaching the fillets (23) from the backbone of the fish by making cuts along the dorsal fins of the fish (2),
   second conveying means (13) for receiving fillets (23) after separation from the backbone in the third cutting unit (20),
   second imaging means (25) for obtaining second image data of the fillets (23),
   characterized in that the computing means (6) determine the position of the fish (2) on the first conveying means (3) and the position of the pin-bones (19) in each fillet (23) of each fish (2) based on the first image data and determine a cutting pattern for the set of water-jet devices (8) to make cuts in the abdominal flaps along the pin-bones (19), and
   in that the first cutting unit (7) is positioned in front of the second cutting unit (9) in order to perform cuts along the pin-bones (19) before the second cutting unit (9) starts separating the fillets (23) from the backbone.

22. The system according to claim 21, wherein the speed of each conveying means (3) can be independently controlled and regulated such that individual cutting and processing steps can be performed at different speed.

23. The system according to claim 21, wherein the first (7), second (9) and third (20) cutting units deliver fillets (23) with the pin-bone strip (27) and the abdominal flaps attached.

24. The system according to claim 21, wherein the system further comprises a skinning device (26) to skin the fillets (23).

25. The system according to claim 21, wherein the computing means (6) determines one or more characteristics of the fillets (23) based on the second image data.

26. The system according to claim 25, wherein the one or more characteristics of the fillets (23) comprises one or more of, size, shape, colour, weight, damages, cutting faults, quality parameters such as TVB-N chemicals.

27. The system according to claim 21, wherein the computing means (6) determines further processing steps based on the second image data.

28. The system according to claim 21, wherein the system further comprises further imaging means (28) to obtain third image data and wherein the third image data and information on markets and demands to determine one or more of: processing steps, batching steps, destination and/or packing.

* * * * *